(12) United States Patent
Hasegawa et al.

(10) Patent No.: US 6,217,796 B1
(45) Date of Patent: *Apr. 17, 2001

(54) NEAR INFRARED ABSORPTION COMPOSITION

(75) Inventors: Shun Hasegawa; Gen Masuda, both of Tokyo (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/439,494

(22) Filed: Nov. 12, 1999

(30) Foreign Application Priority Data

Nov. 17, 1998 (JP) .................................. 10-326289

(51) Int. Cl.$^7$ ................................. F21V 9/04; G02B 5/22
(52) U.S. Cl. .......................................... 252/587; 359/885
(58) Field of Search .............................. 252/587; 359/885

(56) References Cited

U.S. PATENT DOCUMENTS

| | | | |
|---|---|---|---|
| 3,709,830 | * | 1/1973 | Susi ........................................ 252/587 |
| 5,155,009 | * | 10/1992 | Yanagisawa et al. ................. 430/270 |
| 5,336,584 | * | 8/1994 | Yanagisawa et al. ................. 430/270 |
| 5,436,113 | * | 7/1995 | Tsuji et al. ............................ 430/270 |

FOREIGN PATENT DOCUMENTS 2-264788 * 10/1990 (JP) .
11-223720 * 8/1999 (JP) .

* cited by examiner

Primary Examiner—Philip Tucker
(74) Attorney, Agent, or Firm—Kubovcik & Kubovcik

(57) ABSTRACT

The present invention relates to a near infrared absorption composition containing, in a resin, a dithiol-nickel complex represented by the following formula(1):

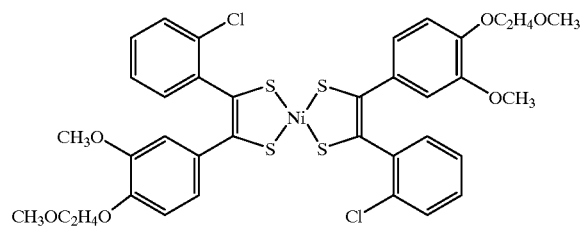

(1)

The near infrared absorption composition has alleviated the problems of the prior are; absorbs the near infrared light emitted from, for example, a display device and is therefore used suitably as a near infrared absorption filter capable of preventing the malfunctioning of electronic appliances placed near the filter; further, has a high transmittance for visible light and high absorbance for near infrared light and is therefore used suitablly as a near infrared absorption filter particularly for plasma display panel.

6 Claims, 2 Drawing Sheets

NEAR INFRARED ABSORPTION COMPOSITION

BACKGROUND OF THE INVENTION (1) Field of the Invention

The present invention relates to a near infrared absorption composition which absorbs the near infrared light (800 to 1,000 nm) emitted from, for example, various display devices and is therefore used suitably as a near infrared absorption filter capable of preventing the malfunctioning of electronic appliances placed near the filter. More particularly, the present invention relates to a near infrared absorption i composition which has a high transmittance for visible light and high absorbance for near infrared light and is therefore used suitably as a near infrared absorption filter particularly for a plasma display panel.

(2) Description of the Prior Art

In recent years, large displays of various types have been developed and commercialized. A plasma display is one of such displays. A plasma display generates a near infrared light during the plasma discharge, as easily understood from the operational mechanism; and since remote control systems of house-hold electronic appliances (such as a TV, air-conditioner, video tape recorder, etc.) use the same or similar wavelength of the near infrared region, a plasma display may cause false functioning of those appliances placed nearby.

Hence, it was proposed to utilize a near infrared absorption filter which can absorb and shield a near infrared light, particularly a region of 800 to 1,000 nm. As such a near infrared absorption filter, there can be mentioned, for example, (1) a filter made of a phosphate glass containing bivalent copper ion, (2) a filter obtained by forming, on a substrate (erg. a glass), a thin layer of metal (e.g. silver) by vapor deposition, sputtering, ion-plating or any other methods, and (3) a filter obtained by adding, to a resin, a dye capable of absorbing a light of the near infrared region.

The above near infrared absorption filters, however, have respective problems. The filter (1) is hygroscopic and employs a complicated production process. The filter (2) has a problem of the reflecting not only the light of near infrared region but of the visible region although its amount is smaller than that in the near infrared region. And also it lowers its transmittance when it is too thick, and has a high production cost as well. In the filters (1) and (2), a glass is used; therefore, the filters are heavy, crack easily, and are difficult to mold.

In contrast, the filter (3) obtained by adding, to a resin, a dye capable of absorbing a light of the near infrared region has various advantages such as light weight as compared with glass-made filters and easy production.

As the dye capable of absorbing a light of the near infrared region, there are known cyanine dyes and phthalocyanine dyes. The cyanine dyes are low in light-fastness and unsuitable for use particularly in plasma display panels. The phthalocyanine dyes show absorption for a light region of 600 to 800 nm but are unable to effectively shield a light region of 800 to 1,000 nm (this shielding for 800 to 1,000 nm is necessary particularly for plasma display panels). Moreover, both the cyanine dyes and the phthalocyanine dyes show high absorbance for the visible light region and are unsuited as a dye for a plasma display panel which requires a high transmittance for visible light.

In contrast, dithiol-metal complexes as a near infrared-absorbing dye are generally superior in heat resistance, are low in visible light absorption as compared with other dyes, and are convenient for use in displays; and it was proposed to use such complexes in displays (see JP-A-9-230134, JP-A-10-62620, JP-A-10-156991 and JP-A-10-157023).

These dithiol-metal complexes, however, have problems when used in displays. The dithiol-metal complexes having the structures described in JP-A-10-156991 and JP-A-10-157023 are unable to exhibit, when used per se, the properties required for use in plasma displays, and must be used in combination with a diimmonium type dye which is an other near infrared-absorbing dye.

The dithiol-metal complexes having the structures described in JP-A-9-230134 and JP-A-10-62620 have no long-term stability and require joint use of an ultraviolet-absorbing layer. The dithiol-metal complex used in the examples of JP-A-9-230134 does not show uniform absorption in a wave-length region of 800 to 1,000 nm and does not efficiently shield the region.

SUMMARY OF THE INVENTION

The present invention aims at alleviating the above-mentioned problems of the prior art and providing a near infra-red absorption composition which absorbs the near infrared light emitted from, for example, a display device and is therefore used suitably as a near infrared absorption filter capable of preventing the malfunctioning of electronic appliances placed near the filter and which further has a high transmittance for visible light and high a absorbance for near infrared light and is therefore used suitably as a near infrared absorption filter particularly a for plasma display panel.

According to the present invention, there is provided a near infrared absorption composition which contains, in a resin, a dithiol-nickel complex represented by the following formula (1):

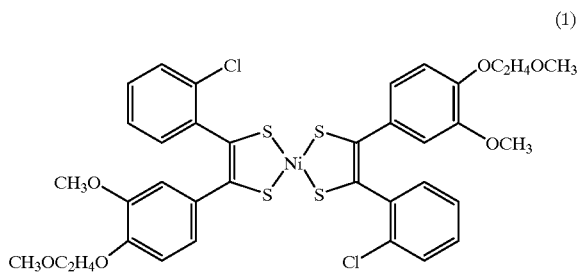

(1)

DETAILED DESCRIPTION OF THE INVENTION

Figure 1:
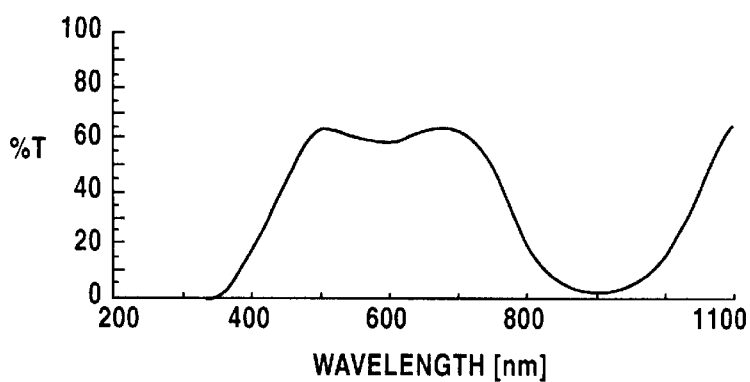
FIG. 1 is an absorption spectrum of the film (near infrared absorption filter) obtained in Example 1.

The present invention is hereinafter described in detail.

The near infrared absorption composition of the present invention comprises mainly a resin and a particular dithiol-nickel complex which is contained in said resin. As to the kind of the resin, there is no particular restriction; however, a resin of acrylic type, methacrylic type, polycarbonate type or polyarylate type is preferred because of high transparency.

The dithiol-nickel complex used in the present invention is represented by the above formula (1). The complex shows, in the resin used in the present invention, the maximum absorption for a wavelength of 900 nm; gives an absorption wave curve which is approximately symmetrical to the maximum absorption wavelength; and can effectively conduct by itself the shielding of a near infrared region of 800 to 1,000 nm which is necessary particularly in plasma display panels.

The dithiol-nickel complex is stable to an ultraviolet light and requires no protective film, and is highly soluble in various organic solvents.

In the present near infrared absorption composition, the proportion of the dithiol-nickel complex to the resin is determined in consideration of the thickness and absorbance required for the near infrared absorption filter produced from the composition. When the absorbance of the filter is fixed, and when the filter is thin, it is necessary to add a large amount of the dithiol-nickel complex to the resin. When the filter is thick, a small amount of the dithiol-nickel complex can be added.

The specific amount of the dithiol-nickel complex added to the resin can be, for example, 1 to 800 mg per the unit area (i.e. 1 $m^2$) of the near infrared absorption filter produced from the present near infrared absorption composition, preferably 5 to 500 mg per 1 $m^2$, and more preferably 30 to 300 mg per 1 $m^2$.

When the amount of the dithiol-nickel complex added is smaller than the above range, no intended amount of absorbance is obtained. When the amount is too large, the transmittance for visible light may be low.

Production of the near infrared absorption composition of the present invention can be conducted by mere addition of the dithiol-nickel complex to the resin, and there is no particular restriction as to the means therefor. However, the dithiol-nickel complex may be added to the resin in the form of a solution dissolved in an appropriate solvent, in order to enable the production of a near infrared absorption filter of film shape from the present near infrared absorption composition by casting or the like.

As the solvent used above, there can be mentioned, for example, ether type solvents such as tetrahydrofuran (THF), diethyl ether and the like; ester type solvents such as ethyl acetate, methyl acetate, butyl acetate and the like; alcohol type solvents such as methanol, ethanol, isopropyl alcohol and the like; chlorine-based solvents such as chloroform, methylene chloride and the like; aprotic polar solvents such as dimethylformamide (DMF), dimethyl sulfoxide (DMSO), N-methylpyrrolidone (NMP) and the like; ketone type solvents such as acetone, methyl ethyl ketone (MEK) and the like; and water.

The near infrared absorption filter of the present invention is made from the above-obtained near infrared absorption composition, and can be produced, for example, by adding a solution of the dithiol-nickel complex to a solution of the resin, stirring the resulting mixture until a uniform solution is obtained, coating the solution on an appropriate substrate by casting or the like, and conducting drying.

The thus-produced near infrared absorption filter of the present invention can be obtained in a film or sheet shape and is suitably used particularly as a near infrared absorption filter for a plasma display panel.

In the present invention, it is possible to further include, in the resin, at least one kind of diimmonium compound represented by the following formula (2), in order to (a) decrease, for cost reduction, the amount of the dithiol-nickel complex of formula (1) which is relatively expensive, and (b) obtain increased absorbance for the 950 to 1,000 nm region.

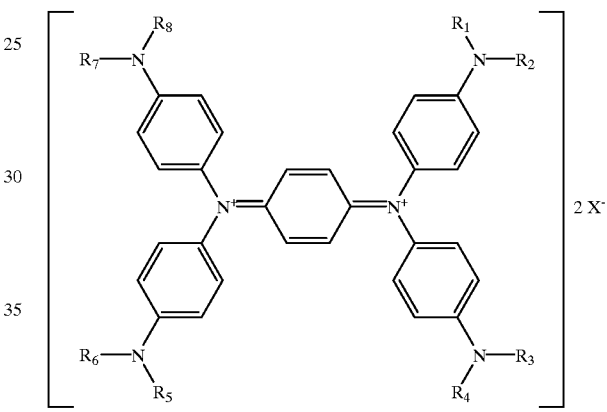

(2)

In the above formula (2), $R_1$ to $R_8$ may be the same or different and are each a hydrogen atom or an alkyl group, and X- is an anion represented by perchloric acid anion or antimony hexafluoride anion. Preferably, $R_1$ to $R_8$ may be the same or different and are each a hydrogen atom or an alkyl group having 1–8 carbon atoms in view of availability.

Examples of the diimmonium compound are as follows.

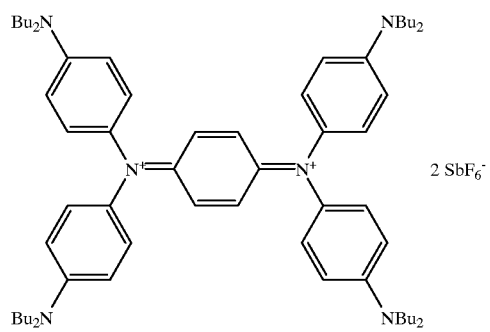

-continued

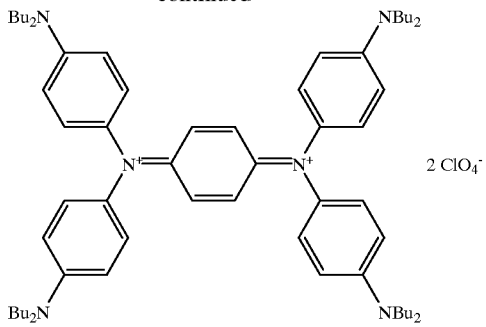

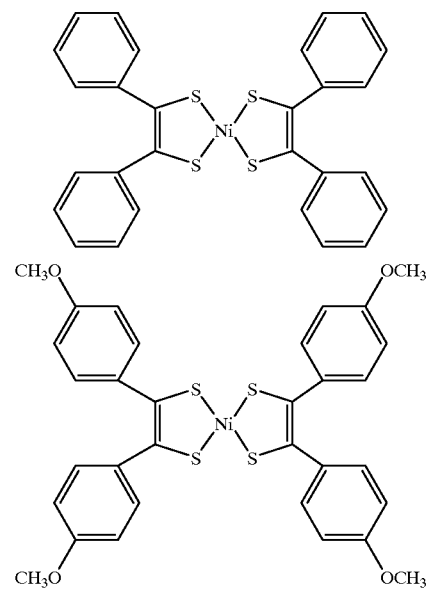

These compounds can give increased absorption for the 950 to 1,000 nm region without significant decrease in transmittance for visible light, and can further decrease the amount of the dithiol-nickel complex of formula (1) used.

The diimmonium compound represented by the formula (2) is added to the resin in an amount of 1 to 800 mg per the unit area of filter, i.e. 1 m², preferably 5 to 500 mg per 1 m², and more preferably 30 to 300 mg per 1 m². When the addition amount is too small, no intended amount of absorbance may be obtained. When the amount is too large, the transmittance for visible light may be low. Therefore, none of such amounts is preferred.

In the present invention, it is also possible to further include, in the resin, at least one kind of another dithiol-nickel complex represented by the following formula (3), in order to (a) increase the absorbabilities for the 800 to 850 nm regions and 950 to 1,000 nm region [the dithiol-nickel complex of formula (1) per se shows relatively low absorption for these regions] and (b) decrease, for cost reduction, the use amount of the dithiol-nickel complex of formula (1) which is relatively expensive.

(3)

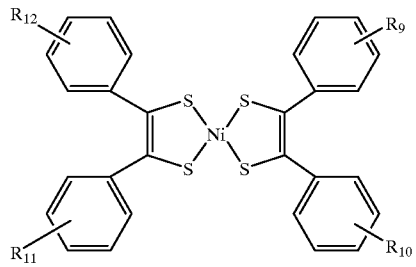

In the above formula (3), $R_9$ to $R_{12}$ may be the same or different and are each an alkyl group having 1 to 4 carbon atoms, an aryl group, an aralkyl group, an alkylamino group, an alkoxy group, a halogen atom or a hydrogen atom. Preferably, $R_9$ to $R_{12}$ may be the same or different and are each a hydrogen atom, an alkoxy group having 1–4 carbon atoms or a dimethylamino group in view of availability.

Examples of the dithiol-nickel complex of formula (3) are as follows.

With such a compound, the absorbance for the 800 to 850 nm region can be increased.

The specific amount of the dithiol-nickel complex of formula (3) added can be, for example, 1 to 800 mg per the unit area (i.e. 1 m²) of the near infrared absorption filter produced from the present near infrared absorption composition, preferably 5 to 500 mg per 1 m², more preferably 30 to 300 mg per 1 m².

When the amount of the dithiol-nickel complex of formula (3) added is smaller than the above range, no intended amount of absorbance is obtained. When the amount is too large, the transmittance for visible light may be low.

There is no particular restriction as to the method of addition of the diimmonium compound of formula (2) or the dithiol-nickel complex of formula (3) to the resin or the present near infrared absorption composition. For example, the diimmonium compound of formula (2) or the dithiol-nickel complex of formula (3) may be added to a solution of the resin together with the dithiol-nickel complex of formula (1), or to the present near infrared absorption composition comprising the resin and the dithiol-nickel complex of formula (1).

Needless to say, the diimmonium compound of formula (2) and the dithiol-nickel complex of formula (3) may be added in combination.

The near infrared absorption composition of the present invention may further comprise a near infrared-absorbing substance, an ultraviolet-absorbing substance (e.g. phthalocyanine, naphthalocyanine type compound), a crosslinking agent, an antioxidant, a polymerization retarder, a dye, a pigment and/or a color-adjusting agent, in view of, for example, the kind of the transparent polymer used.

DESCRIPTION OF PREFERRED EMBODIMENTS

The present invention is described in more detail below by way of Examples.

EXAMPLE 1

In 100 parts by weight of methylene chloride were dissolved 22.6 parts by weight of a polycarbonate resin

[Panlite L1250Z (trade name) produced by Teijin Chemicals Ltd.] and 0.3 part by weight of a dithiol-nickel complex represented by the formula (1). The resulting solution was coated on a polyester film by casting, using a bar coater [Doctor Blade YD-7 (trade name) produced by Yoshimitsu Seiki K.K.] having gaps of 300 gm, to form a film to be used as a near infrared absorption filter. The absorption spectrum of the film is shown in FIG. 1. As is clear from FIG. 1, a light region of 800 to 1,000 nm is shielded sufficiently.

COMPARATIVE EXAMPLE 1

In 100 parts by weight of methylene chloride were dissolved 22.6 parts by weight of a polycarbonate resin [Panlite L1250Z (trade name) produced by Teijin Chemicals Ltd.] and 0.25 part by weight of a dithiol-nickel complex represented by he following formula:

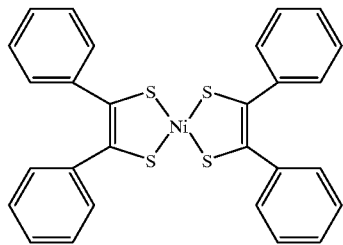

Figure 2:
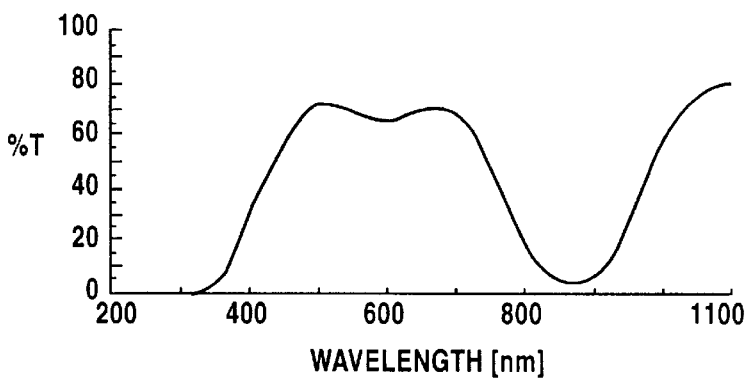
FIG. 2 is an absorption spectrum of the film (near infrared absorption filter) obtained in Comparative Example 1.

The resulting solution was coated on a polyester film by casting, using a bar coater [Doctor Blade YD-7 (trade name) produced by Yoshimitsu Seiki] having gaps of 300 pm, to form a film to be used as a near infrared absorption filter. The absorption spectrum of the film is shown in FIG. 2. As is clear from FIG. 2, the absorption of 950 to 1,000 nm is weak.

COMPARATIVE EXAMPLE 2

In 100 parts by weight of methylene chloride were dissolved 22.6 parts by weight of a polycarbonate resin [Panlite L1250Z (trade name) produced by Teijin Chemicals Ltd.] and 0.25 part by weight of a dithiol-nickel complex represented by the following formula:

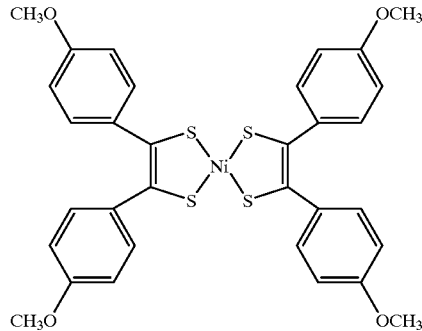

Figure 3:
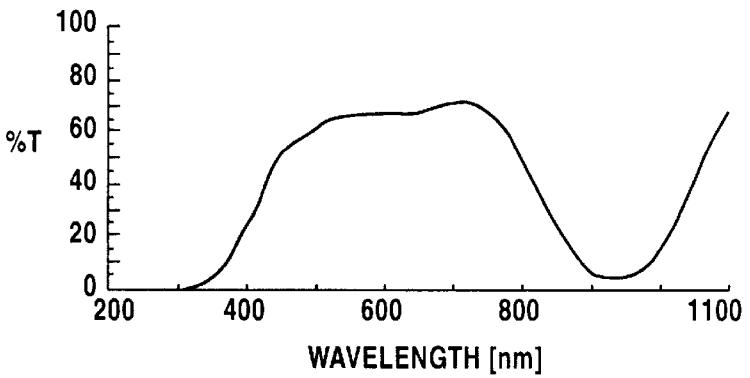
FIG. 3 is an absorption spectrum of the film (near infrared absorption filter) obtained in Comparative Example 2.

The resulting solution was coated on a polyester film by casting, using a bar coater [Doctor Blade YD-7 (trade name) produced by Yoshimitsu Seiki] having gaps of 300 pm, to form a film to be used as a near infrared absorption filter. The absorption spectrum of the film is shown in FIG. 3. As is clear from FIG. 3, the absorption of 800 to 850 nm is weak.

COMPARATIVE EXAMPLE 3

In 100 parts by weight of methylene chloride were dissolved 22.6 parts by weight of a polycarbonate resin [Panlite L1250Z (trade name) produced by Teijin Chemicals Ltd.] and 1.0 part by weight of a dithiol-nickel complex represented by the following formula:

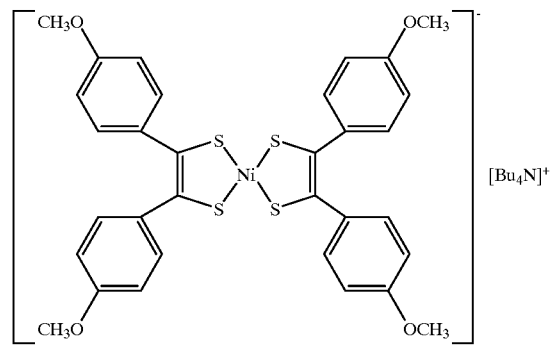

Figure 4:
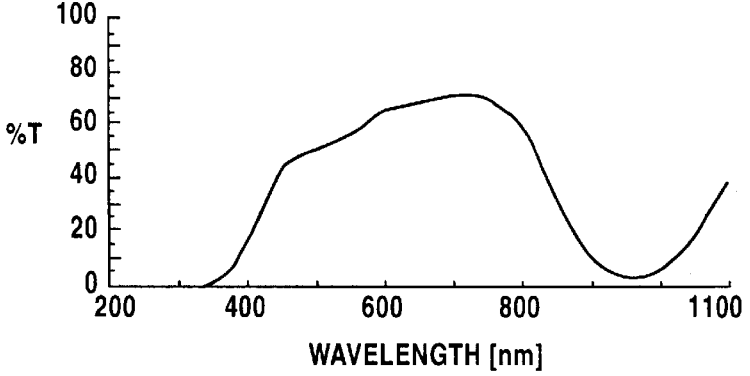
FIG. 4 is an absorption spectrum of the film (near infrared absorption filter) obtained in Comparative Example 3.

The resulting solution was coated on a polyester film by casting, using a bar coater [Doctor Blade YD-7 (trade name) produced by Yoshimitsu Seiki] having gaps of 300 Mm, to form a film to be used as a near infrared absorption filter. The absorption spectrum of the film is shown in FIG. 4. As is clear from FIG. 4, the absorption of 800 to 850 nm is weak and the transmittance for the visible light region (400 to 600 nm) is low.

EXAMPLE 2

In 100 parts by weight of chloroform were dissolved 13.7 parts by weight of a polyarylate [P-5001 (trade name) produced by Unitika Ltd.], 0.07 part by weight of a dithiol-nickel complex represented by the formula (1) and 0.05 part by weight of a diimmonium compound represented by the following formula:

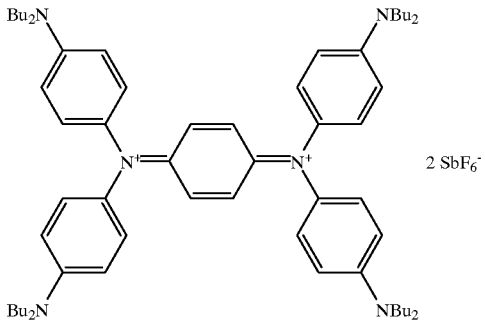

Figure 5:
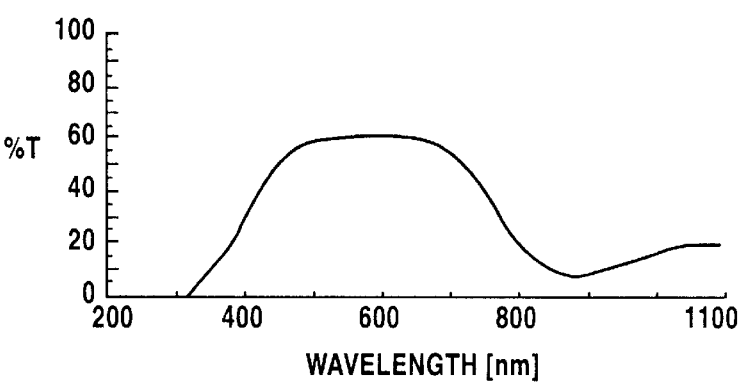
FIG. 5 is an absorption spectrum of the film (near infrared absorption filter) obtained in Example 2.

The resulting solution was coated on a polyester film by casting, using a bar coater (Doctor Blade YD-7 (trade name) produced by Yoshimitsu Seiki) having gaps of 300 pm, to form a film to be used as a near infrared absorption filter. The absorption spectrum of the film is shown in FIG. 5. As is clear from FIG. 5, a light of the near infrared region (800 to 1,000 nm) is shielded sufficiently and the transmittance of visible light is high.

EXAMPLE 3

In 100 parts by weight of chloroform were dissolved 30.0 parts by weight of a methacrylic resin [Acrypet (trade name) produced by Mitsubishi Rayon Co., Ltd.], 0.06 part by weight of a dithiol-nickel complex represented by the formula (1) and 0.08 part by weight of a diimmonium compound represented by the following formula:

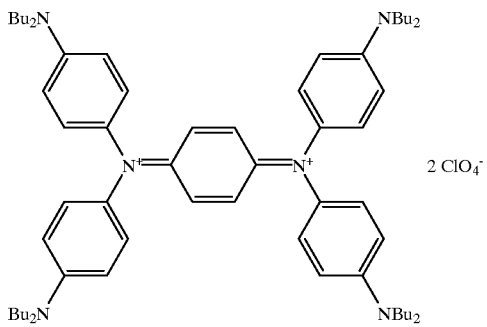

Figure 6:
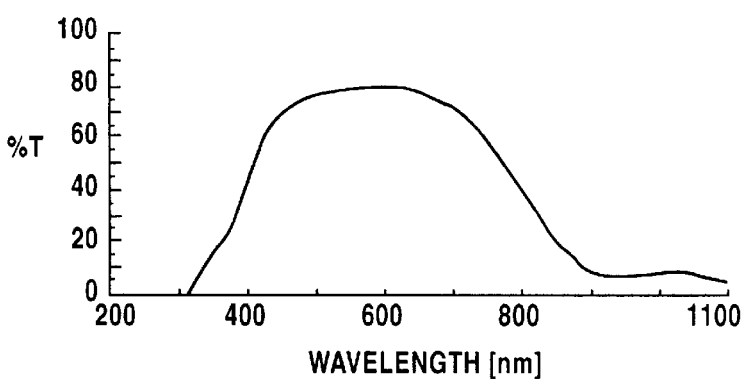
FIG. 6 is an absorption spectrum of the film (near infrared absorption filter) obtained in Example 3.

The resulting solution was coated on a polyester film by casting, using a bar coater [Doctor Blade YD-7 (trade name) produced by Yoshimitsu Seiki] having gaps of 300 pm, to form a film to be used as a near infrared absorption filter. The absorption spectrum of the film is shown in FIG. 6. As is clear from FIG. 6, a light of the near infrared region (800 to 1,000 nm) is shielded sufficiently and the transmittance of visible light is high.

EXAMPLE 4

In 100 parts by weight of chloroform were dissolved 15.0 parts by weight of a cycloolefin polymer [ZEONEX (trade name) produced by Nippon Zeon Co., Ltd.], 0.055 part by weight of a dithiol-nickel complex represented by the formula (1), 0.027 part by weight of a dithiol-nickel complex represented by the following formula:

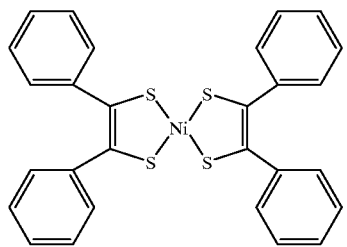

and 0.55 part by weight of a diimmonium compound represented by the following formula:

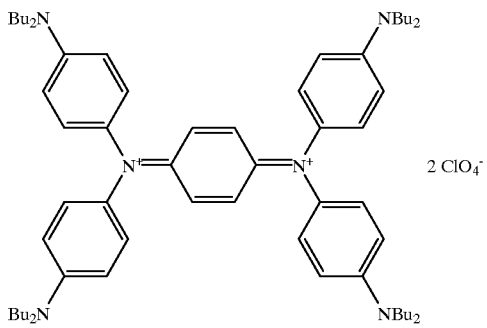

Figure 7:
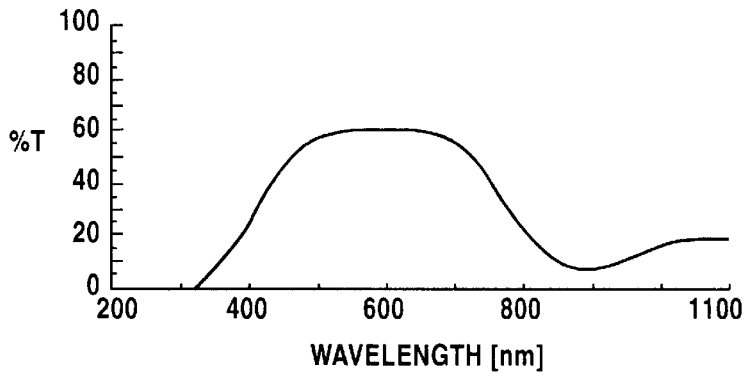
FIG. 7 is an absorption spectrum of the film (near infrared absorption filter) obtained in Example 4.

The resulting solution was coated on a polyester film by casting, using a bar coater [Doctor Blade YD-7 (trade name) produced by Yoshimitsu Seiki] having gaps of 300 pm, to form a film to be used as a near infrared absorption filter. The absorption spectrum of the film is shown in FIG. 7. As is clear from FIG. 7, a light of near infrared region (800 to 1,000 nm) is shielded sufficiently and the transmittance of visible light is high.

EXAMPLE 5

In 100 parts by weight of a methylene chloride/methanol (9/1) mixed solvent were dissolved 7.5 parts by weight of a cellulose triacetate (a product of Aldrich), 0.014 part by weight of a dithiol-nickel complex represented by the formula (1), 0.039 part by weight of a dithiol-nickel complex represented by the following formula:

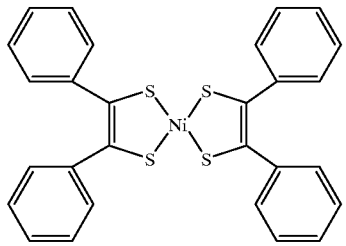

0.057 part by weight of a diimmonium compound represented by the following formula:

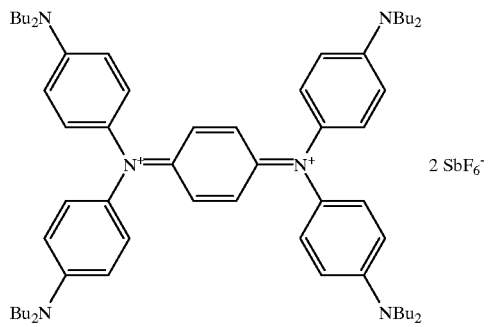

Figure 8:
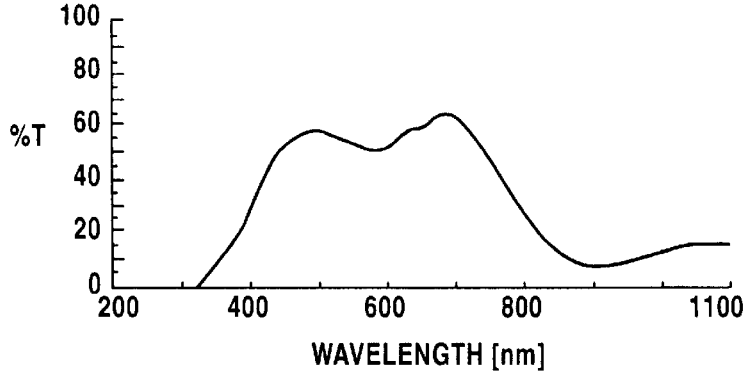
FIG. 8 is an absorption spectrum of the film (near infrared absorption filter) obtained in Example 5.

0.09 part by weight of a color-adjusting dye [Kaya Blue Violet AR (trade name) produced by Nippon Kayaku Co., Ltd.] and 0.03 part by weight of another color-adjusting dye [Kaya Blue N (trade name) produced by Nippon Kayaku Co., Ltd.]. The resulting solution was coated on a polyester film by casting, using a bar coater [Doctor Blade YD-7 (trade name) produced by Yoshimitsu Seiki] having gaps of 300 Mm, to form a film to be used as a near infrared absorption filter. The absorption spectrum of the film is shown in FIG. 8. As is clear from FIG. 8, a light of near infrared region (800 to 1,000 nm) is shielded sufficiently.

The near infrared absorption composition of the present invention can shield a light of near infrared region sufficiently. Therefore, the near infrared absorption filter produced using the present composition, when used in various display devices, can prevent the malfunctioning of electronic appliances present near the filter, caused by a near infrared light. Further, having a high transmittance for visible light, this filter is useful also as a filter for a plasma display panel.

What is claimed is:
1. A near infrared absorption composition which contains, in a resin, a dithiol-nickel complex represented by the following formula (1):

(1)

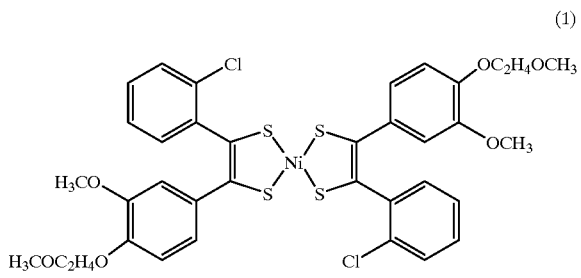

and further containing at least one kind of diimmonium compound represented by the following formula (2):

(2)

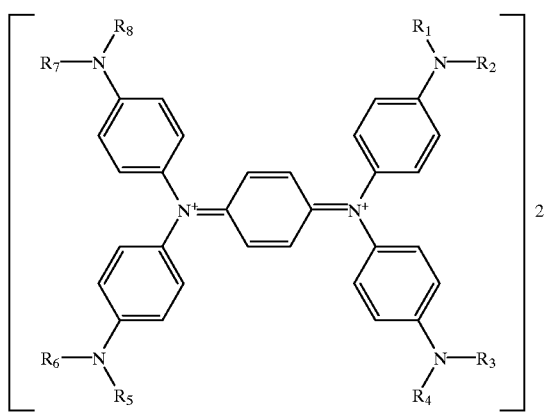

wherein $R_1$ to $R_8$ may be the same or different and are each an alkyl group; and $X^-$ is an anion represented by perchloric acid anion or antimony hexafluoride anion.

2. A near infrared absorption composition which contains, in a resin, a dithiol-nickel complex represented by the following formula (1):

(1)

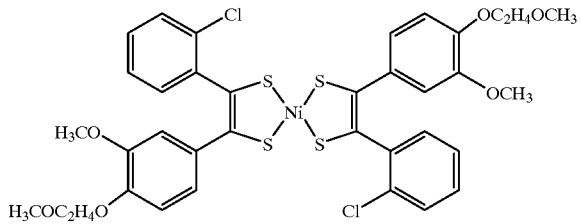

and further comprising at least one kind of dithiol-nickel complex represented by the following formula (3):

(3)

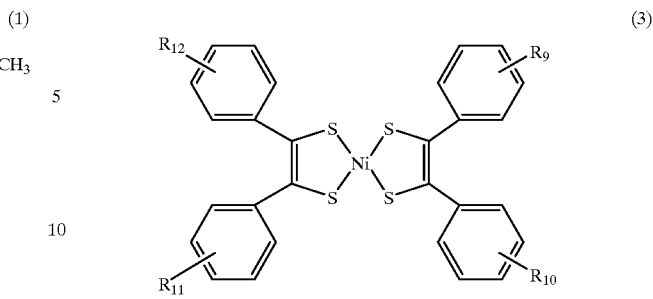

wherein $R_9$ to $R_{12}$ may be the same or different and are each an alkyl group having 1 to 4 carbon atoms, an aryl group, an aralkyl group, an alkylamino group, an alkoxy group, a halogen atom or a hydrogen atom.

3. A near infrared absorption composition according to claim 1, further comprising at least one kind of dithiol-nickel complex represented by the following formula (3):

(3)

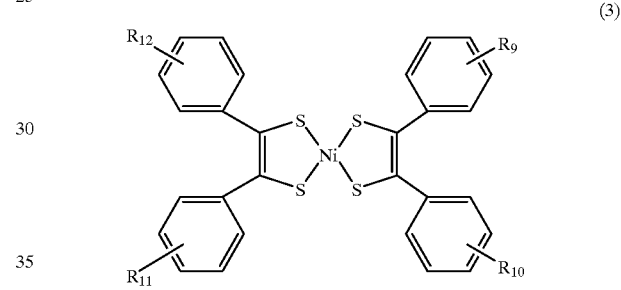

wherein $R_9$ to $R_{12}$ may be the same or different and are each an alkyl group having 1 to 4 carbon atoms, an aryl group, an aralkyl group. an alkylamino group, an alkoxy group, a halogen atom or a hydrogen atom.

4. A near infrared absorption filter made from a near infrared absorption composition set forth in claim 1.

5. A near infrared absorption filter made from a near infrared absorption composition set forth in claim 2.

6. A near infrared absorption filter made from a near infrared absorption composition set forth in claim 3.

* * * * *